(12) United States Patent
Rumsby et al.

(10) Patent No.: US 9,069,749 B1
(45) Date of Patent: Jun. 30, 2015

(54) OPEN RF TEST PACK

(75) Inventors: Steven R. Rumsby, Colts Neck, NJ (US); Joshua Barry Morman, Howell, NJ (US); Ahmed A. Turk, Lakewood, NJ (US); Denis Joseph Ledgerwood, Jr., Colleyville, TX (US)

(73) Assignee: Spirent Communications, Inc., Sunnyvale, CA (US)

( * ) Notice: Subject to any disclaimer, the term of this patent is extended or adjusted under 35 U.S.C. 154(b) by 239 days.

(21) Appl. No.: 12/851,448

(22) Filed: Aug. 5, 2010

Related U.S. Application Data

(60) Provisional application No. 61/231,540, filed on Aug. 5, 2009, provisional application No. 61/231,652, filed on Aug. 5, 2009.

(51) Int. Cl.
*G06F 9/455* (2006.01)
*G06F 11/26* (2006.01)
*H04L 29/06* (2006.01)
*H04J 3/14* (2006.01)
*H04L 12/861* (2013.01)

(52) U.S. Cl.
CPC .............. *G06F 11/261* (2013.01); *H04L 29/06* (2013.01); *H04J 3/14* (2013.01); *H04L 49/90* (2013.01)

(58) Field of Classification Search
USPC ................ 703/23, 19, 21; 370/252, 241, 419; 455/423, 12.1
See application file for complete search history.

(56) References Cited

U.S. PATENT DOCUMENTS

| | | | |
|---|---|---|---|
| 5,761,486 A * | 6/1998 | Watanabe et al. | 703/21 |
| 6,208,841 B1 | 3/2001 | Wallace et al. | |
| 6,636,721 B2 * | 10/2003 | Threadgill et al. | 455/12.1 |
| 7,324,588 B2 | 1/2008 | Green et al. | |
| 7,349,670 B2 | 3/2008 | Mlinarsky et al. | |
| 7,508,868 B2 | 3/2009 | Chang | |
| 7,539,489 B1 * | 5/2009 | Alexander | 455/423 |
| 7,555,420 B2 * | 6/2009 | Wang et al. | 703/23 |
| 7,606,165 B2 * | 10/2009 | Qiu et al. | 370/252 |
| 7,693,082 B2 * | 4/2010 | Wright | 370/246 |
| 8,150,675 B1 * | 4/2012 | Ortmanns et al. | 703/23 |
| 8,213,957 B2 * | 7/2012 | Bull et al. | 455/456.1 |
| 2003/0236089 A1 * | 12/2003 | Beyme et al. | 455/423 |
| 2005/0004787 A1 * | 1/2005 | Kubischta et al. | 703/19 |

(Continued)

OTHER PUBLICATIONS

Kojo et al. Seawind: a Wireless Network Emulator Proceedings of 11th GI/ITG Conference on Measuring, Modelling and Evaluation of Computer and Communication Systems, 2001.*

(Continued)

*Primary Examiner* — Omar Fernandez Rivas
*Assistant Examiner* — Cuong Luu
(74) *Attorney, Agent, or Firm* — Kenta Suzue; Haynes Beffel & Wolfeld LLP

(57) ABSTRACT

A channel emulator generates radio channel conditions of live cellular base station signals in a simulation of a radio environment of a fielded cellular network, based on a record of captured radio signal data of a plurality of cellular base stations in the fielded cellular network. A generates a simulation of a fielded cellular network. In one aspect, the radio channel conditions in the simulation of the radio environment are synchronized with events in the simulation of the fielded cellular network. In another aspect, an event handling state machine directs configurable events in the simulation of the fielded cellular network in response to radio channel conditions in the simulation of the radio environment.

23 Claims, 8 Drawing Sheets

(56) References Cited

U.S. PATENT DOCUMENTS

| | | |
|---|---|---|
| 2006/0072466 A1* | 4/2006 | Wang et al. .................. 370/241 |
| 2006/0209866 A1* | 9/2006 | Steenkiste et al. ............ 370/419 |
| 2006/0223522 A1* | 10/2006 | Guo et al. .................... 455/423 |
| 2006/0229018 A1* | 10/2006 | Mlinarsky et al. ......... 455/67.11 |
| 2006/0229019 A1 | 10/2006 | Mlinarsky |
| 2006/0233111 A1* | 10/2006 | Wright ......................... 370/241 |
| 2006/0239198 A1 | 10/2006 | Mlinarsky et al. |
| 2007/0019769 A1 | 1/2007 | Green et al. |
| 2008/0239972 A1* | 10/2008 | Omar ........................... 370/250 |
| 2009/0305702 A1* | 12/2009 | Toppinen et al. ........... 455/435.2 |
| 2010/0273504 A1* | 10/2010 | Bull et al. .................. 455/456.1 |
| 2010/0304686 A1* | 12/2010 | Kennedy et al. ........... 455/67.11 |

OTHER PUBLICATIONS

CiteSeerX—Seawind a Wireless Networkd Emulator 2001.*
CiteSeerX—Seawind: a Wireless Network Emulator, 2001.*

* cited by examiner

Fig. 4A

- Test Manager running 2-cell Dynamic RF test case with converted drive test data as stimulus

OPEN RF TEST PACK

REFERENCE TO RELATED APPLICATION

This application claims the benefit of U.S. Provisional Patent Application No. 61/231,540 filed 5 Aug. 2009, and claims the benefit of U.S. Provisional Patent Application No. 61/231,652 filed 5 Aug. 2009, all of which are incorporated herein by reference.

RELATED APPLICATION

This application is related to "Virtual Drive Test Tool" filed 5 Aug. 2010, incorporated herein by reference.

BACKGROUND

1. Field of the Invention

The present invention relates to systems, methods, and computer readable media for wireless device testing.

2. Description of Related Art

Wireless network operators and device manufactures typically perform field testing to evaluate device performance and prove capabilities.

However, field testing is complex and the testing environment is not well controlled. As a result, troubleshooting of events which occur during drive testing typically requires extensive repetition of the field drive tests. This kind of testing is time consuming and expensive, making it difficult to do more than basic functional testing over a limited set of configurations and underlying conditions.

Additionally, since different wireless devices may respond quite differently to the same RF scenarios, the field drive tests are typically repeated for each of the different devices.

In or around the year 2000, Spirent Communications, Inc. provided Qualcomm Inc. with technology that tested mobile handsets based on previously gathered field RF measurements. Also in or around the year 2000, Kyocera Wireless Corp. bought Qualcomm Inc.'s terrestrial Code Division Multiple Access (CDMA) wireless handset business. It is believed that the technology described in U.S. Pat. No. 7,508,868 assigned to Kyocera Wireless Corp., is derived from the technology provided by Spirent Communications, Inc. to Qualcomm Inc., and that this technology provided by Spirent Communications, Inc. to Qualcomm Inc. is cumulative to the contents of U.S. Pat. No. 7,508,868 assigned to Kyocera Wireless Corp. U.S. Pat. No. 7,508,868 is incorporated herein by reference.

U.S. Pat. No. 7,508,868 describes a technology which is limited in that, the emulated base station signals are directed exclusively at recreating a captured RF environment, without recreating the network events corresponding to the captured RF environment. In U.S. Pat. No. 7,508,868, the retrievers fail to create logs of network events, and the instrumentation is missing the synchronized capacity. Consequently, the mobile device in U.S. Pat. No. 7,508,868 makes calls at random times, without regard to timing of the RF environment.

It is therefore desirable to provide methods and systems for testing wireless devices addressing the various issues discussed above.

SUMMARY

A lab based system for testing of wireless devices as described herein includes test equipment delivering test signals to the wireless device which incorporate representative and/or actual measured time varying RF channel parameters which emulate network communications with the device. The time varying changes in RF channel parameters may, for example, be based on actual field drive testing, be based on representative models, based on combinations thereof, as well as a variety of other techniques.

As described herein, the system consists of software applications and hardware coupled in a unique way to enable wireless device testing over a broad range of RF channel conditions, while also allowing for timing critical measurements of events of the wireless device across the test scenarios. In addition, network events which were recorded in the field can be played back in the test environment in a time-synchronous manner with the RF channel conditions which were simultaneously recorded, and the network emulators configured. Examples of network events are the set of network messages (sent by the mobile phone or the network), and network procedures (such as call setup, handovers, call drop). As a result, the performance of the wireless device can be efficiently and accurately measured over a large set of configurations and underlying conditions.

The dynamic lab test environment emulation described herein can elicit responses and behaviors in wireless devices matching real-world performance observed during field drive testing. Using a lab based system as described herein allows for repeatable playback of changes in RF channel parameters over time which is useful for debug and verification of the devices, and thus can dramatically reduce or eliminate field drive testing and its associated uncertainties and expenses. Furthermore, devices and technologies that cannot be brought into the field can be tested in the lab under realistic conditions.

Other aspects and advantages of the present invention can be seen on review of the drawings and the detailed description.

BRIEF DESCRIPTION OF THE DRAWINGS

FIG. 4A shows a screenshot of an example DEE file.

DETAILED DESCRIPTION

Figure 1:
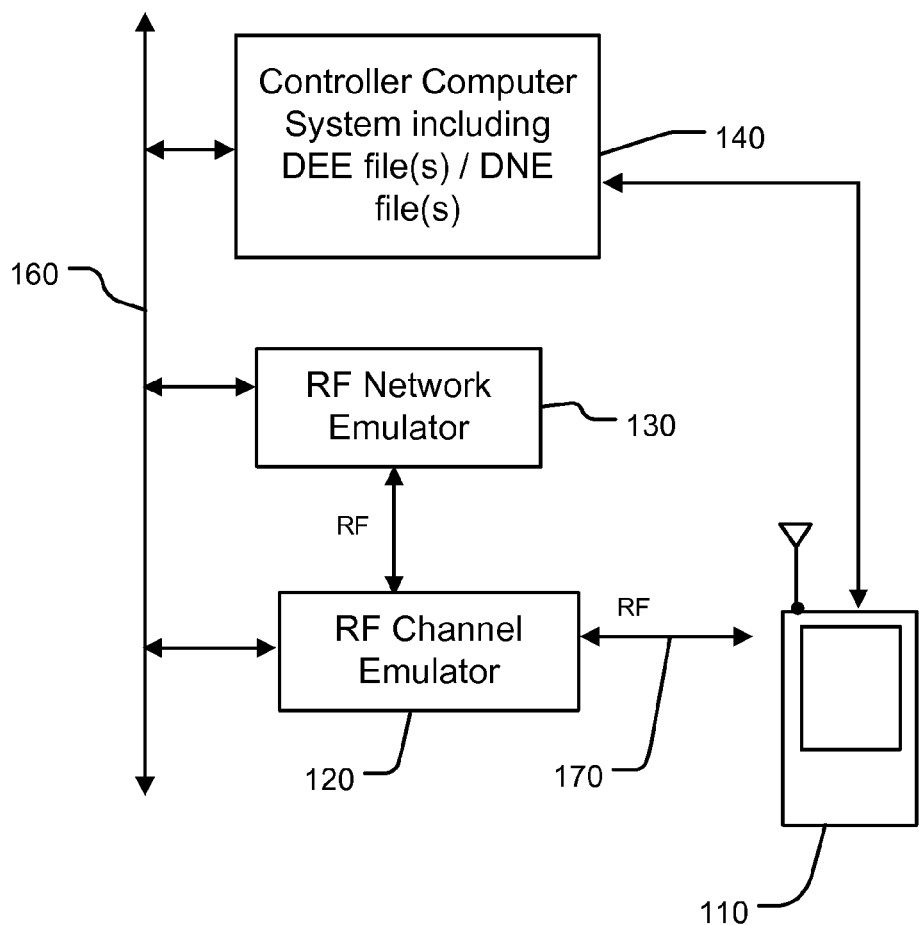
FIG. 1 is a block diagram of a lab based measurement system for evaluating the performance of a wireless device with captured RF channel conditions.

FIG. 1 is a simplified diagram of an embodiment of a lab based measurement system 100 for evaluating the performance of a wireless receiver such as wireless device 110 as described herein. As used herein, the term "wireless device" refers generally to any portable device that has wireless connectivity to at least one network, such as a cellular telephone network and/or internet. The wireless device 110 may be a cellular phone, PDA, laptop computer, or other device. Examples of a cellular environment are GSM, WCDMA, LTE, WiMAX, and CDMA (different radio access technologies). A cellular environment smoothly hands off a data or voice call between cellular base stations. In contrast, a WLAN connection simply ends when a WLAN access point becomes out of range, such that a smooth hand off does not occur. From a system view, a cellular environment relies on channel reuse throughout a cellular coverage region, by limiting a particular same set of channels within certain geographic areas—cells—that are separated sufficiently to limit interference. Neighboring cells are positioned closely enough to provide adequate coverage and smooth handoff between neighboring cells.

The system 100 includes test equipment including RF channel emulator 120 and RF network emulator 130 to deliver test signals to the wireless device 110 which incorporate representative and/or actual measured changes in RF channel parameters over time to emulate network communications with the device 110.

The channel emulator 120 provides the ability to emulate radio channel characteristics such as fading, noise, etc. The channel emulator 120 can be, for example, a Spirent SR5500 Wireless Channel Emulator manufactured by Spirent Communications, PLC of Eatontown, N.J. In FIG. 1, only one channel emulator 120 is shown. More generally, one or more channel emulators 120 may be used, depending upon the particular details of the tests to be performed.

The network emulator 130 provides the ability to emulate network conditions such as operating bands, downlink data rates, uplink data rates, code power, etc. The network emulator 130 can be, for example, a Spirent SR 3420 Network Emulator manufactured by Spirent Communications, PLC. In FIG. 1, only one network emulator 130 is shown. More generally, one or more network emulators 130 may be used, depending upon the particular details of the tests to be performed. The network emulator 130 transmits its downlink signal to the channel emulator 130 through either a wired RF or digital baseband (DBB) connection.

In conjunction with the Network Emulator, a configurable state machine responds to network events in a manner defined by either the user directly by setting a number of configurable parameters, or the behavior of which is automatically extracted from the network or wireless device captured logs, such that the events are handled in the same manner as recorded in the field scenario.

An event handling state machine is a configurable real time state machine that can be configured to react to events from the mobile in a specified manner.

In real-world cellular networks, the behavior of the state machine, which dynamically responds to events from the mobile device and initiates procedures with the mobile device based on network conditions, is not spelled out in the specification precisely; the specific implementation is left up to the network and infrastructure vendors. In the test system, state machine defined behavior of responding to different events, can be programmatically controlled by the user, or extrapolated from drive logs, to model the desired network to be emulated. For example, in one WCDMA network when quality measurement event 5A, which indicates that a predefined number of bad CRCs has been exceeded, is sent by the mobile device, the network may respond by downshifting the data rate accordingly. Alternatively other networks, or the same network under different loading conditions, may increase the range of downlink power control (DLPC), or start compressed mode (CM) for inter-frequency/inter-RAT measurements.

In the test system, the rules which define the responses of the network to various measurement events, or other Layer 3 signaling, are configurable so as to fully define the state transitions of the state machine. The conditions which influence state transitions include but are not limited to the current call state, network loading, and cellular topology.

The Network emulator allows for a configurable cellular topology which may include multiple emulated cells of different technologies. Cell topology is the number of simulated cells and the particular cells that belong to a particular Radio Access Technology (RAT) and network. This topology can be different than the topology which was seen in the field log data, namely in that typically a smaller number of emulated cells would be present than were seen in a drive log.

The emulators are synchronized by a cable connected between a sync out port on the network emulator 130 and a trigger in port on the channel emulator 120 on which a pulse is sent from the network emulator 130 to the channel emulator 120. The network emulator 130 and the channel emulator 120 are also synchronized by a 10 MHz reference signal which connects from the 10 MHz Ref Out on the channel emulator 130 to the 10 MHz Ref In on the network emulator. As described in more detail below, the synchronization enables timing critical measurements of events of the wireless device 110 during the testing. As a result, the frame number of events from the wireless device 110 received by the channel emulator 120 during testing can be directly mapped to the corresponding emulated RF channel parameters in which the events occurred.

The channel emulator 120 is coupled to the mobile device 110 through a communication link 170 used for the transmission of RF signals between the emulators 120, 130 and the device 110. The communication link 170 may be a wireline link, an optical link, a wireless link, and combinations thereof, or any other mechanism for communication with the mobile device 110, depending upon the properties of the device 110. Various means of connection to the device 110 are possible such as, for example, a cabled RF test port or data port such as a serial or USB port on the device 110. As another example the connection may be a wireless data port such as Bluetooth.

The system 100 can also include additional test equipment not shown in FIG. 1. For example, the system 100 may include a packet core network emulator to emulate network delay/latency, packet loss, packet jitter, etc. The packet core network emulator can be, for example, a Spirent SR3610, manufactured by Spirent Communications, PLC. The application server emulator can be, for example, a Spirent SR3920, manufactured by Spirent Communications, PLC.

The system 100 also includes a controller computer system 140 coupled to the emulators 120, 130 via an Ethernet connection 160 in the illustrated embodiment. Alternatively, other techniques may be used.

The controller computer system 140 is also connected to the wireless device 110 via a control interface which may be a serial or USB connection. This connection allows the controller computer to initiate network procedures from the mobile device.

The controller computer system 140 stores a user configurable Dynamic Environment Emulation (DEE) file (discussed in more below) used to change the state of one or both of the emulators 120, 130 at specified time intervals to deliver test signals to the wireless device 110 which incorporate representative and/or actual measured changes in RF channel parameters over time to emulate network communications with the device 110.

This DEE file could be extracted from actual drive test data collected by a scanning device using a conversion tool. This conversion tool would generate a DEE file which, when played back in this system, accurately reproduces the RF channel conditions as measured by the scanning device. For WCDMA channels, this can include accurately reproducing RSSI, Ec/Io, and RSCP, and for GSM channels this includes accurately reproducing RSSI and C/I ratio. The conversion process also considers the reality of mapping a larger number of cells seen in the drive test to the number of channels available in the lab-based system. This file could also be created by the user to represent a known or hypothetical RF scenario.

In addition to extracting the RF channel characteristics, other information can be automatically extracted from the drive test data and used to accurately model the real world environment including, but not limited to, System Information Broadcast messages (SIBs), Layer 3 Signaling, and Network procedures (such as the beginning and end of calls, SMS messages, data transfers, etc).

Along with the playback of the RF channel characteristics, a sequence of network events can be programmed to occur at specific times relative to the start of the RF channel scenario playback.

The controller computer system 140 stores a user configurable Dynamic Network Emulation (DNE) file (discussed in more below) used to sequence network events at specified time intervals initiated by either the emulator 130 or the wireless device. These events can be either user generated or extracted from the drive test data to occur at the same time relative to the actual channel conditions in the field. The DEE and DNE files are referenced from the same time base.

In the case that the DNE file is automatically created by a conversion process of the drive logs, parameters, in the case of WCDMA emulation, such as System Information Broadcast Messages (SIBs), Measurement Control Messages, Layer 3 signaling, the initiation of network procedures such as Call Setup, start of data transfer, etc., and any other messages, events, or procedures, that can be recorded in mobile device or network side logs can be sequenced in a file that aligns with the time reference of the DEE file, as a part of the same conversion process that is used to output the RF channel conditions to a playback file. For example, if in the drive log, the mobile device initiated a data transfer at time t1 relative to the beginning of the recorded scenario, after the conversion process, the DNE file would contain and entry (row) timestamped with time t1, and the type of procedure to be performed with the associated parameters. Upon playback of this DNE file, as the RF conditions are changing because of playback of the DEE file, the data transfer would be initiated under the same RF channel conditions as was seen in the field, and the throughput and reliability and other metrics and measurements can be logged in a time-synchronous fashion.

Alternatively, to simulate a known or hypothetical scenario, such as setting up a call at a different point in the recorded RF scenario than occurred in the drive log, the user can manually enter such events into the DNE file via a graphical interface in the Test Manager software, with timestamps as to when the events or change in network parameters are scheduled to occur, which align with the time reference of the DEE file.

The controller computer 140 executes a computer program to initiate the test, to configure and remotely operate the various elements of the system 100 during the test including the loading of parameters from the DEE and DNE files into one or both of the emulators 120, 130, and to perform post-processing of the measured results.

The measured results use the same time reference for reported data that corresponds to the RF channel conditions, the network events, or any other information available during the test execution. The time references of the reported results are common and synchronized across multiple technologies emulated in the test system. At any given point in time the user can determine the RF conditions and Network measurements that were present at the time of any situation that occurred during the test.

Also, as the test is executing a procedural graph is shown to overlay the current status of the call, network events, various metrics such as data throughput, with a visual representation of the physical layer measurements being played back on the RF Channel Emulator, such as carrier power, noise power, relative power of each multipath, relative power of each MIMO link, modeled Doppler velocity or frequency, relative power and angle of Line of Sight components, amplitude and phase variation of each of multiple paths, and any other parameter which is available on the Channel Emulator.

Figure 2:
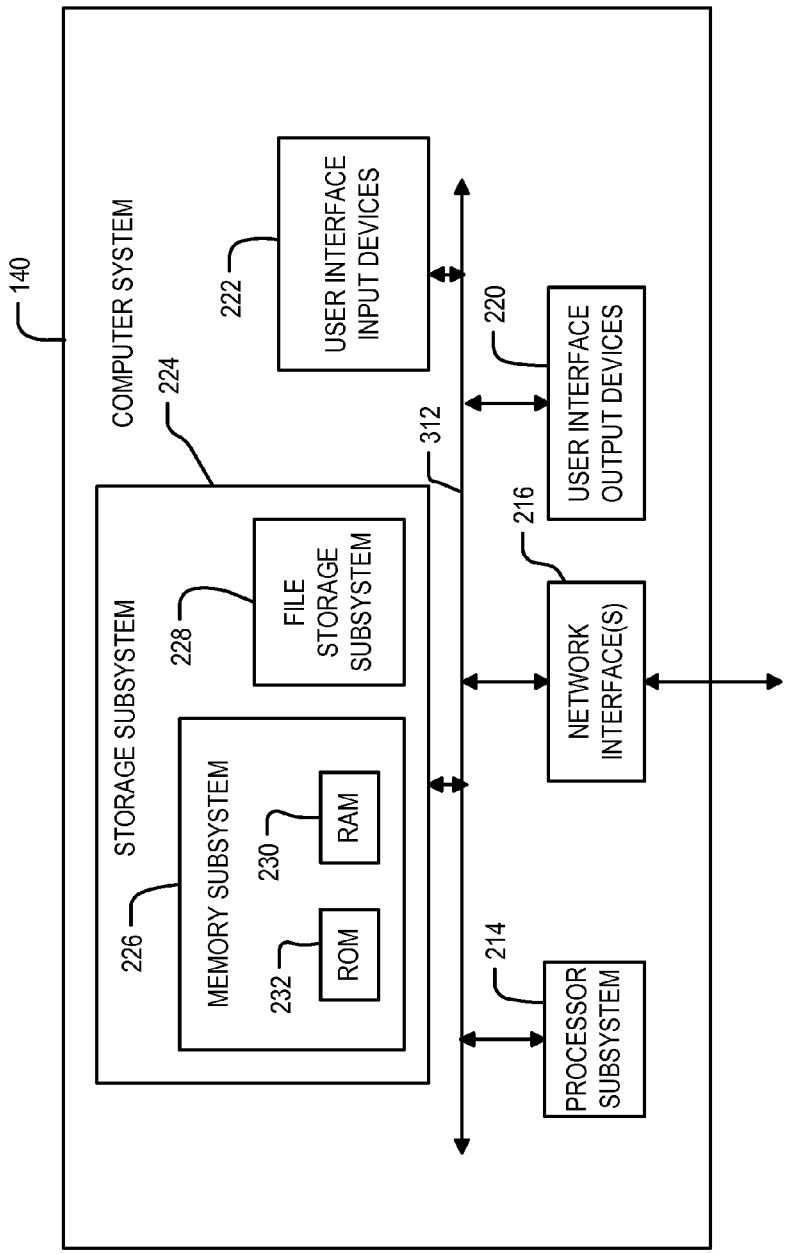
FIG. 2 is a simplified block diagram of the controller computer system of the lab based measurement system of FIG. 1.

FIG. 2 is a simplified block diagram of an embodiment of the controller computer system 140. The dynamic control of the parameters of the emulators 120, 130 as described herein can be implemented by a computer program stored in memory, or in other memory that can be distributed separately from the computer system as an article of manufacture.

Computer system 140 typically includes a processor subsystem 214 which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 140. Network interface subsystem 216 provides an interface to outside networks and devices of the system 100. Communication network 218 may comprise many interconnected computer systems and communication links. These communication links may be wireline links, optical links, wireless links, or any other mechanisms for communication of information.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 210 or onto computer network 218.

User interface output devices 220 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 140 to the user or to another machine or computer system.

Storage subsystem 224 stores the basic programming and data constructs that provide the functionality of certain embodiments of the present invention. For example, the various modules implementing the functionality of certain embodiments of the invention may be stored in storage subsystem 224. These software modules are generally executed by processor subsystem 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 228. The host memory 226 contains, among other things, computer instructions which, when executed by the processor subsystem 214, cause the computer system to operate or perform functions as described herein. As used herein, processes and software that are said to run in or on "the host" or "the computer", execute on the processor subsystem 214 in response to computer instructions and data in the host memory subsystem 226 including any other local or remote storage for such instructions and data.

Bus subsystem 212 provides a mechanism for letting the various components and subsystems of computer system 140 communicate with each other as intended. Although bus subsystem 212 is shown schematically as a single bus, alternative embodiments of the bus subsystem may use multiple busses.

Computer system 140 itself can be of varying types including a personal computer, a portable computer, a workstation, a computer terminal, a network computer, a television, a mainframe, or any other data processing system or user device. Due to the ever changing nature of computers and networks, the description of computer system 140 depicted in FIG. 2 is intended only as a specific example for purposes of illustrating embodiments of the present invention. Many other configurations of computer system 140 are possible having more or less components than the computer system depicted in FIG. 2.

The following document is incorporated herein by reference, which defines terms that are used in the present specification:
ETSI TS 125 331 V9.2.1 (2010-05)
Technical Specification
Universal Mobile Telecommunications System (UMTS);
Radio Resource Control (RRC);
Protocol specification
(3GPP TS 25.331 version 9.2.1 Release 9)

Although the flow charts are indicative of specific radio access technologies, the flow charts are applicable to radio access technologies other than the particular radio access technology discussed, or indicated in the Figure. For example, although some of the flow charts are indicative of WCDMA, the concepts and description of the flow charts are applicable to non-WCDMA radio access technologies, such as GSM, LTE, WiMAX, and CDMA.

Figure 3:
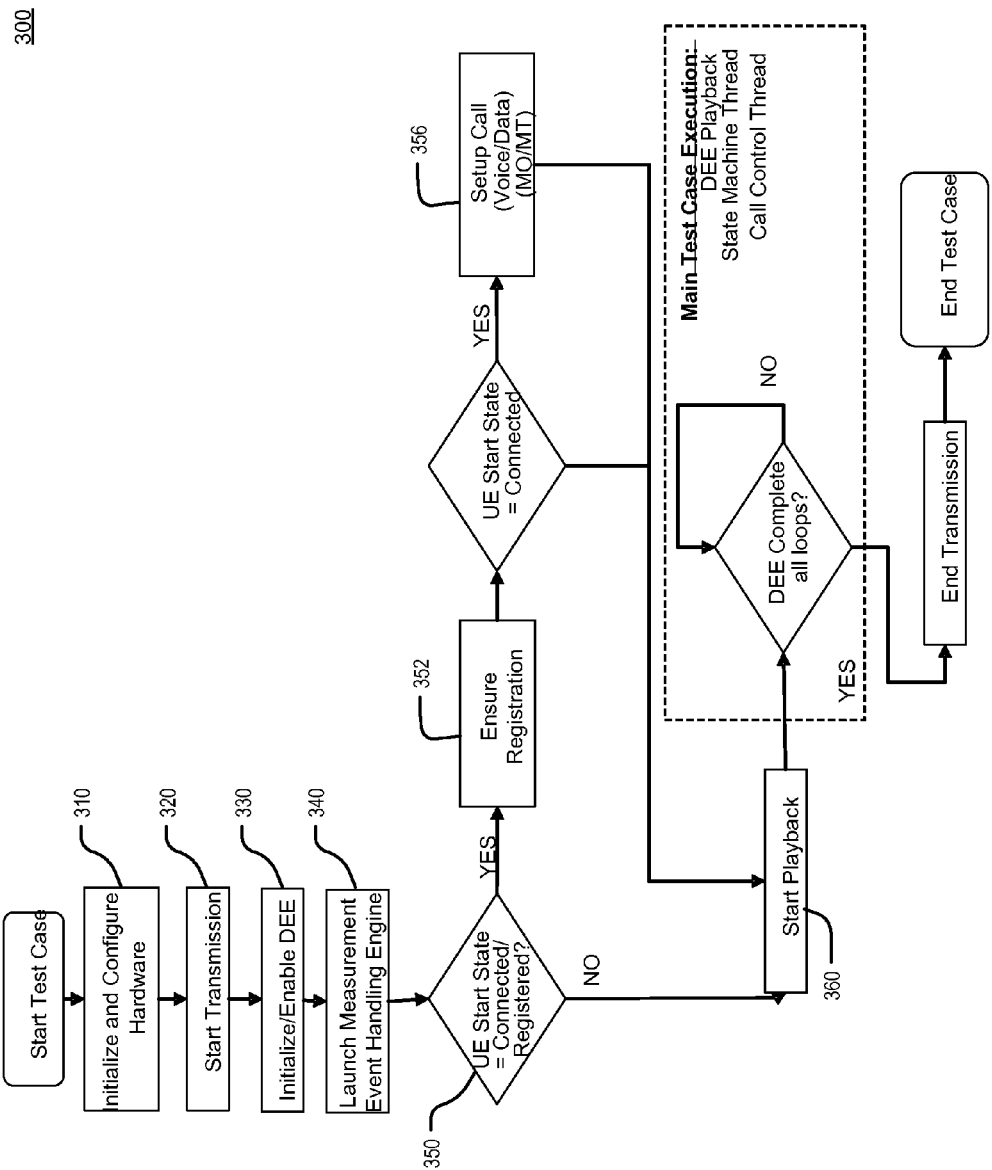
FIG. 3 is a flow chart of a test process for the of the lab based measurement system of FIG. 1

FIG. 3 is a flow chart of an embodiment of a test process 300 for using the system 100 of FIG. 1 to change the state of one or both of the emulators 120, 130 at specified time intervals to deliver test signals to the wireless device 110 to emulate network communications with the device 110.

The process 300 is an automated measurement process that is initiated by the controller computer system 140 using a computer program containing sequences of instructions that implement each of the various steps described hereinafter. As with all flowcharts herein, it will be appreciated that many of the steps can be combined, performed in parallel or performed in a different sequence without affecting the functions achieved. In some cases a re-arrangement of steps will achieve the same results only if certain other changes are made as well, and in other cases a re-arrangement of steps will achieve the same results only if certain conditions are satisfied. Such re-arrangement of steps will achieve the same results only if certain conditions are satisfied. Such re-arrangement possibilities will be apparent to the reader.

At block 310 the hardware of the system 100 is initialized and configured. Block 310 includes configuring the emulators 120, 130 to an initial static state. This can be done for example, by loading a configuration file or selecting a pre-configured profile.

Block 310 also includes configuring the wireless device 110 to look for certain RF channel characteristics during testing, so that when the mobile device 110 experiences these particular RF channel characteristics the mobile device 110 will raise certain events such as attempting a handover.

Next, transmission of the signals from the emulators 130, 120 to the device 110 starts at block 320.

At block 330 the dynamic environment emulation (DEE) is initialized and enabled. This includes loading the information contained in State 1 of the DEE file into the emulators 120 and 130. The particular parameters specified in the DEE file overwrite those of the static configuration, so that the overall RF channel conditions are a combination of the configured state and what is specified in the DEE file. This step also includes initialization of the dynamic network emulation (DNE) to configure the network parameters to their initial state, which may change as the DNE file is played out.

Figure 4A:
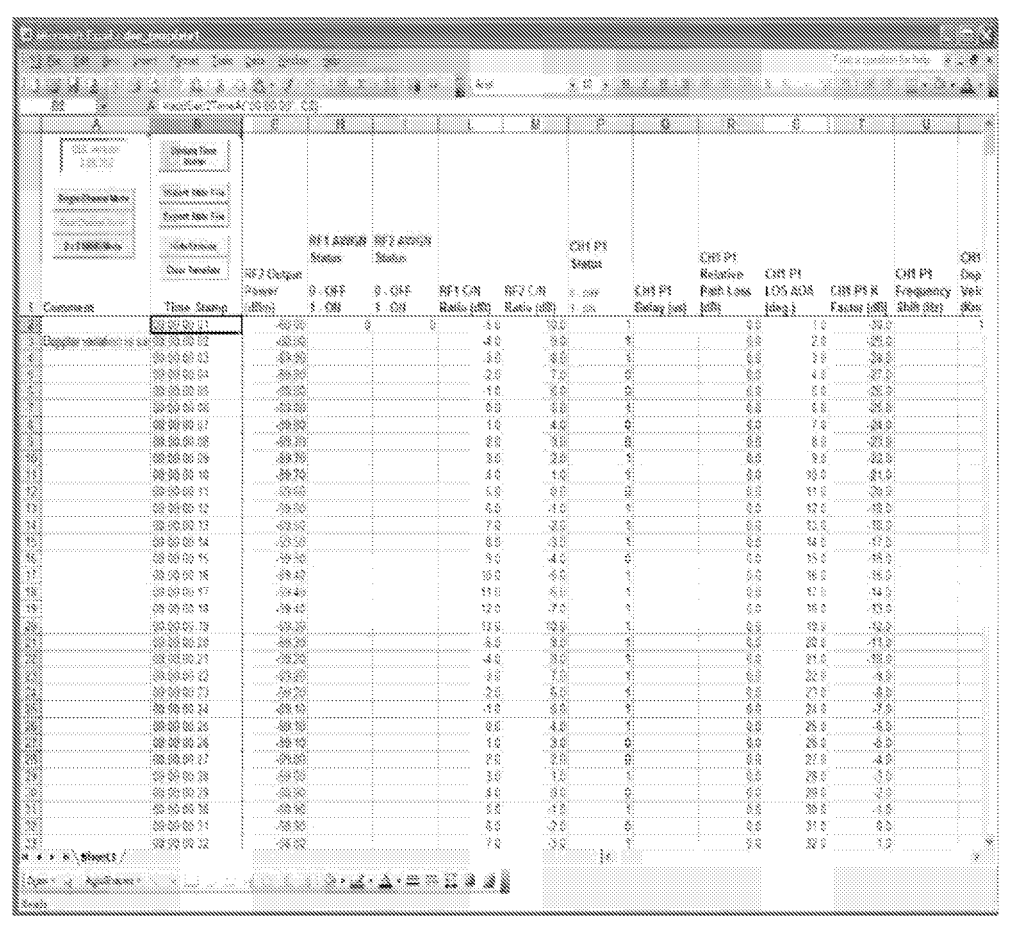

Parameters that can be stored in the DEE file, and thus can be changed in the emulators 120, 130 at specified time intervals during testing, include state duration, channel output power, AWGN Status (On/Off), C/N ratio, Path Status (On/Off), Path Delay, Relative Path Loss, Rician Line of Sight Angle of Arrival, Rician K Factor, Frequency Shift, Doppler Velocity, MIMO Sub-Channel Status (On/Off), MIMO Sub-Channel Relative Power, and MIMO Sub-Channel Phase, and Correlation Matrix between MIMO subchannels. With playback of the DNE file, additional parameters may also be changed dynamically on the network emulator 130, such as System Information Broadcast messages (SIBs), Measurement Control Messages, Network events and initiation of procedure, etc. FIG. 4A shows a screenshot of an example DEE file.

At block 340 the event handling state machine engine is launched which handles and responds to the wireless device 110 measurement reporting events according to a configuration specified in the test case parameters. This configuration specifies which Measurement Control Message will be configured at the UE and how the state machine will respond. As described in more detail below, the state machine acts autonomously in response to the wireless device 110 measurement reporting events caused by the changing RF channel conditions given by the DEE file playback during testing, but the behavior is configured to match that of the network which is being emulated in the test system. This behavior can be extracted from the field drive logs, in order to program the state machine to match the behavior of the field network. In the illustrated embodiment the state machine is hierarchical, and is embedded in both the firmware of the network emulator 130 and in the test manager software on the computer controller 140.

At block 350, the test case operation is determined by the Test Case Parameter "UE Start State", which is part of the Test Manager Software in this example. This is one example of an initial state that the UE can be placed in prior to execution of the DEE and DNE files. Further network events and UE behavior will be driven by the DNE file, or fixed responses to specific call control situations. For example, the control software may be configured to automatically set up a new call when a call is dropped. Alternatively, other modes of operation for call control can be implemented.

If the UE Start State is set to "None", no mobile device 110 activity is needed to continue to the test case of block 360. If the UE Start State is set to "Registered", the test case will wait for the mobile device 110 to register to a cell (block 352) before continuing to the test case of block 360. If the UE Start State is set to "Connected", the test case will wait for registration (block 352) and set up a call (for example, a Mobile Terminated Voice, Mobile Originated Voice, Mobile Originated R99/HSDPA/HSUPA data) (block 356) or other kind of package switch IP before continuing to the test case of block 360.

Once the wireless device has performed any necessary startup actions, DEE playback begins at block 360 by loading states of the DEE file at specified time intervals which change the state of the emulators 120, 130. The DEE playback is initiated by a trigger signal sent by the network emulator 130 to the channel emulator 120, the trigger signal kicking off the DEE playback.

Figure 4B:
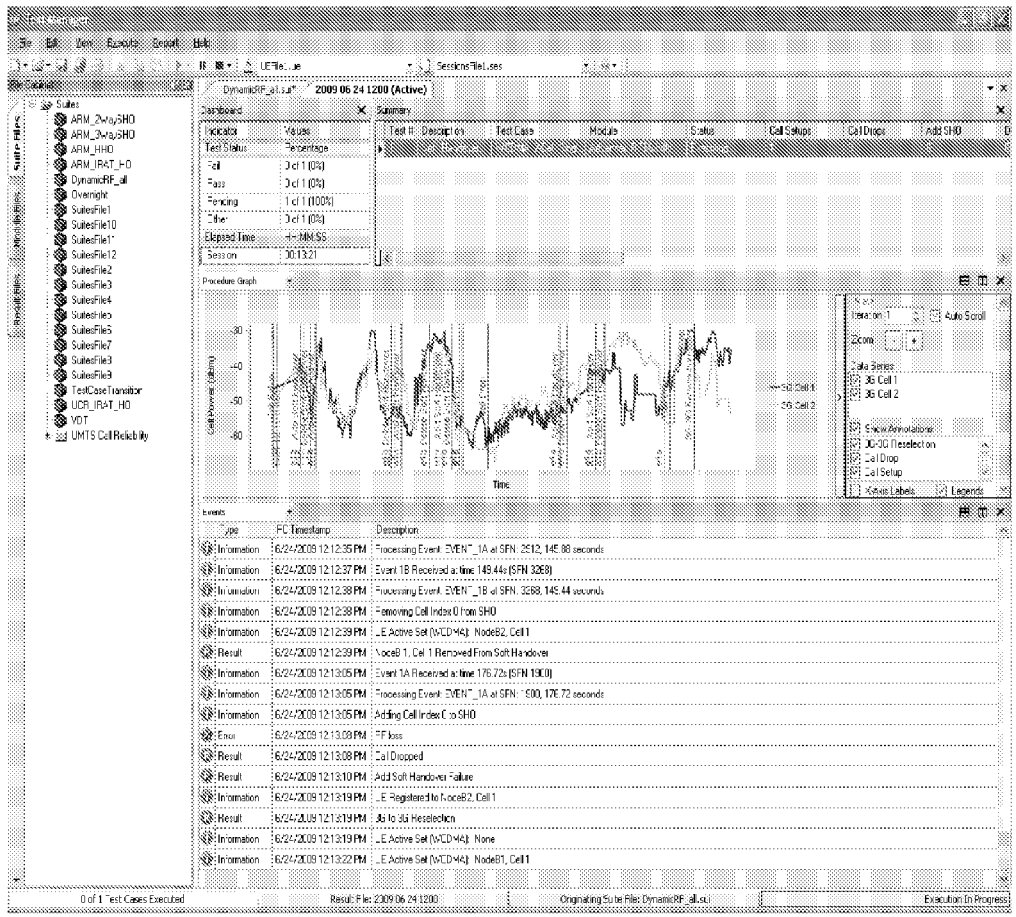
FIG. 4B is a screen shot of the Test Manager running a 2-cell Dynamic RF test case using converted drive test data as stimulus.

As noted above, the DEE file can incorporate representative and/or actual measured time varying RF channel parameters which emulate network communications with the device 110. FIG. 4B is a screen shot of the Test Manager running a 2-cell Dynamic RF test case using converted drive test data as stimulus.

As mentioned above, other modes of operation for call control can be implemented. For example, during the DEE playback, the test case can also automatically handle call control, so that this information can be programmatically handled in a manner similar to the DEE file. For example, any UE or Network action such as setting up a call (voice or data), releasing a call, starting a data transfer, sending an SMS can occur at specific times as specified in the DEE file (or similar file). In FIG. 3, this is referred to as the "Call Control Thread", where such actions are initiated at specified times, and this could be information extracted from a drive log.

The network emulator 130 observes the mobile device 110, and a log file with time stamps of the measurement reporting events from the mobile device 110 is maintained. Further timestamp network and UE logging is provided by the network emulator 120, information beyond measurement reporting events, including but not limited to as RACH Preamble timing, Handover Timing, Call Drop timing, etc. The timestamps in this reported information are time-synchronized in the same manner as the RF channel conditions which are known ahead of playback. In this way all events can be time correlated to the RF channel conditions which were present at the time of the event, to allow the user to analyze potential causes of undesirable scenarios.

Figure 5:
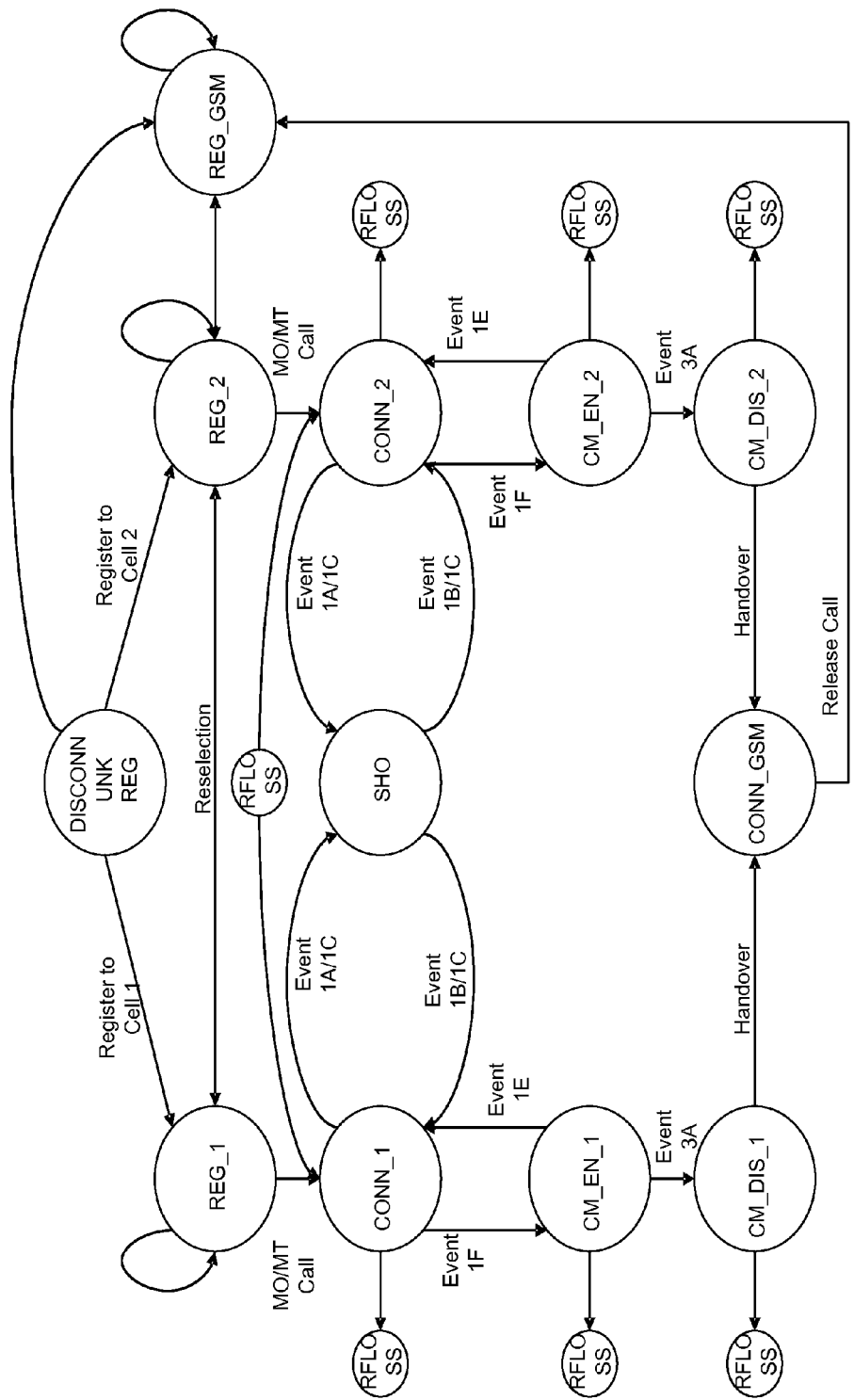
FIG. 5 shows the event handling state machine state diagram.

The measurement reporting events from the mobile device 110 are handled by the event handling state machine. The behavior of the state machine is configurable in the test case parameters and also depends on the cell topology defined in the test case. An example of one embodiment of the event handling state machine state diagram is shown in FIG. 5. This state machine can be configured to match the behavior of the field network which is being modeled in the test system either by manually setting parameters, or the parameters extracted from the drive logs. Further details on the example state diagram of FIG. 5 are described in the document incorporated by reference herein entitled "UMTS Open RF: Dee Call Reliability Test Case".

Figure 6:
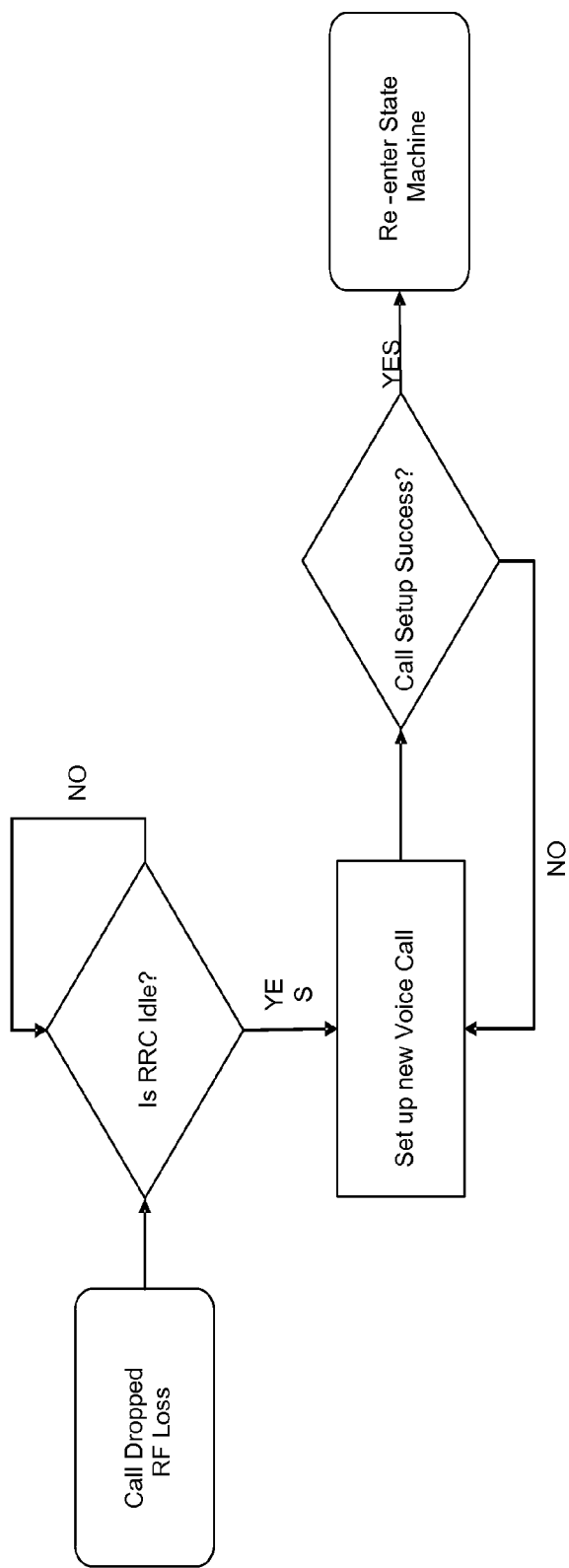
FIG. 6 shows a flow diagram for handling a dropped call.
Figure 7:
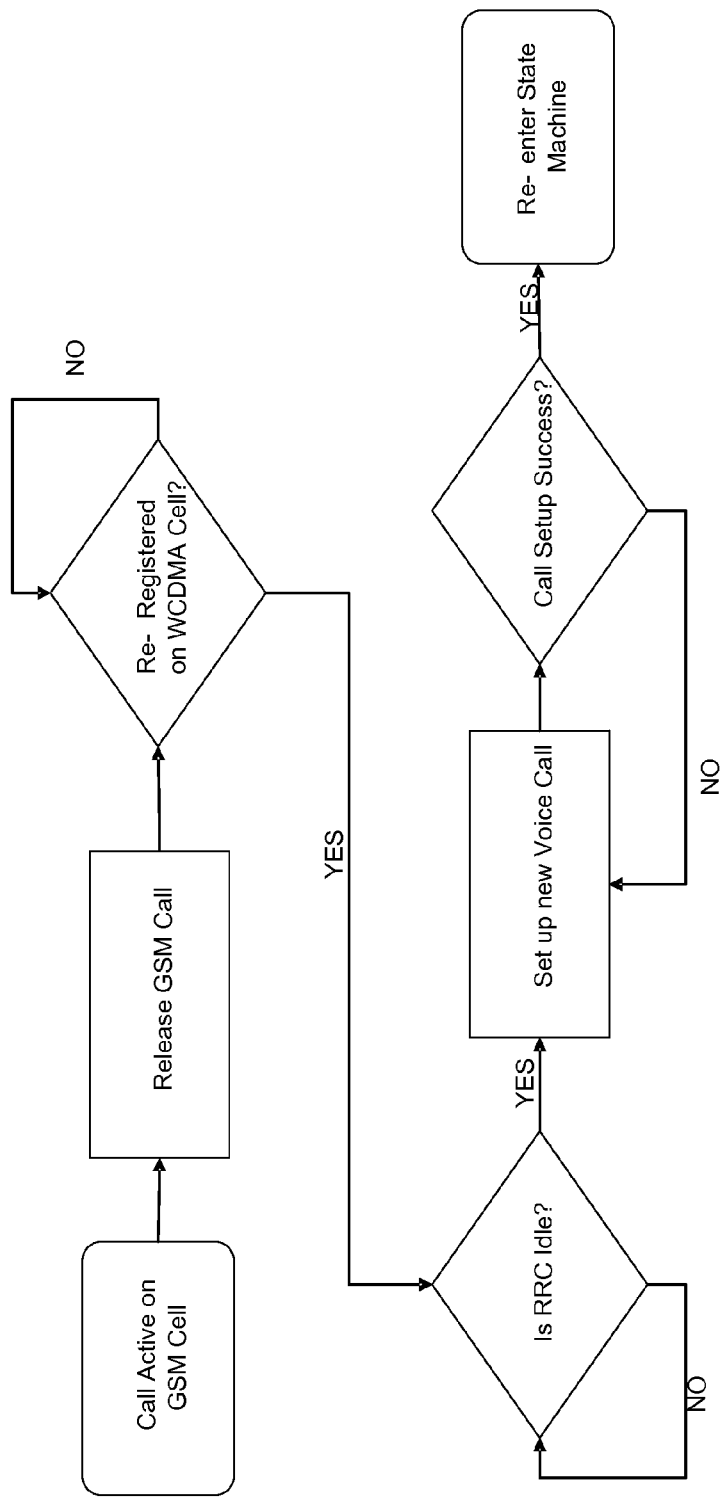
FIG. 7 shows the flow diagram when a call is detected on GSM

In addition to performing actions in response to the measurement events from the mobile device 110, the state machine typically will also perform additional actions such as those due to a dropped call (labeled "RF LOSS" in FIG. 5) or entry into an unsupported state. FIG. 6 shows a flow diagram for handling a dropped call. FIG. 7 shows the flow diagram when a call is detected on GSM (usually from a successful IRAT handover), the call is immediately released and the state machine waits for re-registration on a WCDMA cell to begin attempting to set up another call.

Aspects of the present invention may be practiced as a method or device adapted to practice the method. The invention may be an article of manufacture such as a media impressed with logic to carry out the steps of the method when executed by a computer.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Also incorporated by reference herein, are the following containing further information of the present invention: a 9 page document titled "UMTS Open RF: DEE Call Reliability Test Case"; and a 16 slide presentation titled "UMTS Call Reliability".

Other aspects are directed to a computer readable medium storing executable code that performs various embodiments described herein, such as the synchronization of radio channel conditions in the simulation with events in the simulation of the fielded cellular network.

One aspect of the technology is a system with a channel emulator and a network emulator.

The channel emulator comprises one or more processors and accesses instructions executable by the processors including instructions that cause the channel emulator to generate radio channel conditions of live cellular base station signals in a simulation of a radio environment of a fielded cellular network, based on a record of captured radio signal data of a plurality of cellular base stations in the fielded cellular network.

The network emulator is coupled to the channel emulator. The network emulator comprises one or more processors and stores instructions executable by the processors including instructions that cause the network emulator to generate a simulation of the fielded cellular network. The simulation of the fielded cellular network can be configured manually or in an automated fashion from the captured data. Because a goal of simulation is to be as accurate as possible, the simulation of the fielded cellular network will be close, if not identical, to the original fielded cellular network.

The radio channel conditions in the simulation of the radio environment are synchronized with events in the simulation of the fielded cellular network.

In one embodiment, for a configurable radio access technology, the radio channel conditions in the simulation of the radio environment are synchronized with events in the simulation of the fielded cellular network.

In one embodiment, the system generates a first log of the radio channel conditions in the simulation of the radio environment and a second log of the events in the simulation of the fielded cellular network, the first log and the second log being synchronized to a same time reference.

One embodiment includes a wireless receiver coupled to the channel emulator. The wireless receiver during simulation may be the same as, or different from, wireless receiver used in capturing the radio signal data.

Another aspect of the technology is a system with a channel emulator and a network emulator.

The channel emulator comprises one or more processors and accesses instructions executable by the processors including instructions that cause the channel emulator to generate radio channel conditions of live cellular base station signals in a simulation of a radio environment of a fielded cellular network, based on a record of captured radio signal data of a plurality of cellular base stations in the fielded cellular network. The simulation of the fielded cellular network can be configured manually or in an automated fashion from the captured data.

The network emulator is coupled to the channel emulator. The network emulator comprises one or more processors and stores instructions executable by the processors including instructions that cause the network emulator to generate a simulation of the fielded cellular network. The simulation of the fielded cellular network can be configured manually or in an automated fashion from the captured data. Because a goal of simulation is to be as accurate as possible, the simulation of the fielded cellular network will be close, if not identical, to the original fielded cellular network.

An event handling state machine directs a configurable response to events in the simulation of the fielded cellular network in response to conditions in the simulation of the radio channel conditions.

In one embodiment, the system supports a configurable topology of cells in the simulation of the fielded cellular network.

In one embodiment, the system supports configurable network settings in the simulation of the fielded cellular network.

In one embodiment, the system supports the simulation of the fielded cellular network of different cellular vendors.

In one embodiment, the system supports automated configuration of the event handling state machine to match the fielded cellular network.

In one embodiment, the event handling state machine guarantees timely handling of critical events from a mobile phone in the simulation.

In one embodiment, the system plays back the radio channel conditions from the record of captured radio signal data of a plurality of cellular base stations in the fielded cellular network.

In one embodiment, the system plays back network events from the record of captured radio signal data of a plurality of cellular base stations in the fielded cellular network. Alternatively, the network events can be some arbitrary sequence.

In one embodiment, the system plays back network events from the record of captured radio signal data of a plurality of cellular base stations in the fielded cellular network, and the network events are mobile initiated.

In one embodiment, the system plays back network events from the record of captured radio signal data of a plurality of cellular base stations in the fielded cellular network, and the network events are mobile terminated.

In one embodiment, the system graphically displays the simulation of the radio channel conditions overlaid with the events in the simulation of the fielded cellular network.

In one embodiment, the system supports dynamically changing correlation of MIMO links.

One embodiment includes a wireless receiver coupled to the channel emulator. The wireless receiver during simulation may be the same as, or different from, wireless receiver used in capturing the radio signal data.

Another aspect of the technology is a method, comprising:
generating radio channel conditions of live cellular base station signals in a simulation of a radio environment of a fielded cellular network, based on a record of captured radio signal data of a plurality of cellular base stations in the fielded cellular network; and
generating a simulation of a fielded cellular network; and
synchronizing the radio channel conditions in the simulation of the radio environment are with events in the simulation of the fielded cellular network.

Another aspect of the technology is a method, comprising:
generating radio channel conditions of live cellular base station signals in a simulation of a radio environment of a fielded cellular network, based on a record of captured radio signal data of a plurality of cellular base stations in the fielded cellular network;
generating a simulation of the fielded cellular network;
directing, with an event handling state machine, a configurable response to events in the simulation of the fielded cellular network in response to radio channel conditions in the simulation of the radio environment.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in the art. While the present invention has been described by reference to preferred embodiments and examples detailed above, it is understood that these examples are intended in an illustrative rather than in a limiting sense. Computer-assisted processing may be used to implement the described embodiments. Accordingly, the present invention may be embodied in methods for performing the specified steps, systems including logic and resources to carry out the specified steps, media impressed with logic to carry out the specified steps, data streams impressed with logic to carry out the specified steps, or computer-accessible services that carry out the specified steps. It is contemplated that modifications and combinations will readily occur to those skilled in the art, which modifications and combinations will be within the spirit of the invention.

The invention claimed is:

1. A system, comprising:
a channel emulator comprising one or more processors and accessing instructions executable by the processors including instructions that cause the channel emulator to generate radio channel conditions of live wireless base station signals in a simulation of a radio environment of a fielded wireless network, based on a record of captured radio signal data of a plurality of wireless base stations in the fielded wireless network, wherein the captured radio signal data includes multiple paths of a signal with at least attenuation and delay for each of the multiple paths;
a network emulator coupled to the channel emulator, the network emulator providing data to the channel emulator for the simulation by the channel emulator, the network emulator comprising one or more processors and storing instructions executable by the processors including instructions that cause the network emulator to generate a simulation of network events of the fielded wireless network, wherein the radio channel conditions in the simulation of the radio environment are synchronized with the network events in the simulation of the fielded wireless network.

2. The system of claim 1, wherein, for a configurable radio access technology, the radio channel conditions in the simulation of the radio environment are synchronized with events in the simulation of the fielded wireless network.

3. The system of claim 1, wherein the system generates a first log of the radio channel conditions in the simulation of the radio environment and a second log of the events in the simulation of the fielded wireless network, the first log and the second log being synchronized to a same time reference.

4. The system of claim 1, further comprising:
a wireless receiver coupled to the channel emulator.

5. A system, comprising:
a channel emulator comprising one or more processors and accessing instructions executable by the processors including instructions that cause the channel emulator to generate radio channel conditions of live wireless base station signals in a simulation of a radio environment of a fielded wireless network, based on a record of captured radio signal data of a plurality of wireless base stations in the fielded wireless network, wherein the captured radio signal data includes multiple paths of a signal with at least attenuation and delay for each of the multiple paths;
a network emulator coupled to the channel emulator, the network emulator providing data to the channel emulator for the simulation by the channel emulator, the network emulator comprising one or more processors and storing instructions executable by the processors including instructions that cause the network emulator to generate a simulation of the fielded wireless network,
wherein an event handling state machine directs a configurable response to network events in the simulation of the fielded wireless network in response to conditions in the simulation of the radio channel conditions.

6. The system of claim 5, wherein the system supports a configurable topology of cells in the simulation of the fielded wireless network.

7. The system of claim 5, wherein the system supports configurable network settings in the simulation of the fielded wireless network.

8. The system of claim 5, wherein the system supports the simulation of the fielded wireless network of different wireless vendors.

9. The system of claim 5, wherein the system supports automated configuration of the event handling state machine to match the fielded wireless network.

10. The system of claim 5, wherein the event handling state machine guarantees timely handling of critical events from a device under test in the simulation.

11. The system of claim 5, wherein the system plays back the radio channel conditions from the record of captured radio signal data of a plurality of wireless base stations in the fielded wireless network.

12. The system of claim 5, wherein the system plays back network events from the record of captured radio signal data of a plurality of wireless base stations in the fielded wireless network.

13. The system of claim 5, wherein the system plays back network events from the record of captured radio signal data of a plurality of wireless base stations in the fielded wireless network, and the network events are device under test initiated.

14. The system of claim 5, wherein the system plays back network events from the record of captured radio signal data of a plurality of wireless base stations in the fielded wireless network, and the network events are device under test terminated.

15. The system of claim 5, wherein the system graphically displays the simulation of the radio channel conditions overlaid with the events in the simulation of the fielded wireless network.

16. The system of claim 5, wherein the system supports dynamically changing correlation of MIMO links.

17. The system of claim 5, further comprising:
a wireless receiver coupled to the channel emulator.

18. A method, comprising:
generating, with a channel emulator, radio channel conditions of live wireless base station signals in a simulation of a radio environment of a fielded wireless network, based on a record of captured radio signal data of a plurality of wireless base stations in the fielded wireless network, wherein the captured radio signal data includes multiple paths of a signal with at least attenuation and delay for each of the multiple paths; and
generating, with a network emulator providing data to the channel emulator for the simulation by the channel emulator, a simulation of a fielded wireless network; and
synchronizing the radio channel conditions in the simulation of the radio environment with network events in the simulation of the fielded wireless network.

19. A method, comprising:
generating, with a channel emulator, radio channel conditions of live wireless base station signals in a simulation of a radio environment of a fielded wireless network, based on a record of captured radio signal data of a plurality of wireless base stations in the fielded wireless network, wherein the captured radio signal data includes multiple paths of a signal with at least attenuation and delay for each of the multiple paths;
generating, with a network emulator providing data to the channel emulator for the simulation by the channel emulator, a simulation of the fielded wireless network;
directing, with an event handling state machine, a configurable response to network events in the simulation of the fielded wireless network in response to radio channel conditions in the simulation of the radio environment.

20. The system of claim 1, wherein the events in the simulation of the fielded wireless network include at least any of network messages sent by a device under test, or network messages sent by the fielded wireless network, and network procedures.

21. The system of claim 5, wherein the events in the simulation of the fielded wireless network include at least any of network messages sent by a device under test, or network messages sent by the fielded wireless network, and network procedures.

22. The method of claim 18, wherein the events in the simulation of the fielded wireless network include at least any of network messages sent by a device under test, or network messages sent by the fielded wireless network, and network procedures.

23. The method of claim 19, wherein the events in the simulation of the fielded wireless network include at least any of network messages sent by a device under test, or network messages sent by the fielded wireless network, and network procedures.

* * * * *